United States Patent [19]
Diepeveen

[11] 3,873,144
[45] Mar. 25, 1975

[54] DIE HOLDING TOOL AND METHOD OF USING SAME

[76] Inventor: John C. Diepeveen, 1737 Kimberly Dr., Sunnyvale, Calif. 94087

[22] Filed: June 28, 1973

[21] Appl. No.: 374,738

[52] U.S. Cl. ........... 294/64 R, 29/203 P, 29/203 V, 214/1 BT, 269/21
[51] Int. Cl. ............................................. B66c 1/02
[58] Field of Search .................. 294/64 R, 65, 65.5; 29/203 R, 203 P, 203 V, 203 MM; 72/477; 214/1 B, 1 BB, 1 BS, 1 BT, 1 BH, 8.5 D; 269/21; 271/90; 279/3

[56] References Cited
UNITED STATES PATENTS

| | | | |
|---|---|---|---|
| 1,033,069 | 7/1912 | Hansen | 294/64 R X |
| 3,056,317 | 10/1962 | Huber et al. | 214/1 BS X |
| 3,271,555 | 9/1966 | Hirshon et al. | 29/203 V X |
| 3,438,668 | 4/1969 | Olsson et al. | 294/64 R |
| 3,738,560 | 6/1973 | Kulicke et al. | 29/203 P X |

*Primary Examiner*—Evon C. Blunk
*Assistant Examiner*—Johnny D. Cherry

[57] ABSTRACT

An improved tool for use with a die bonding machine. The tool has means on one end thereof for releasably holding an elongated die in either of a pair of angularly disposed positions, including a first group of spaced, die-engaging lips between which a die extends when the die is in a first position and a second group of die-engaging lips disposed transversely of the first group of lips for positioning the die when the latter is in the second position extending transversely of the first die position on the tool. The tool has a fluid passage therethrough terminating at a location between the lips so that, when the passage is coupled to a source of vacuum, a die can be held releasably thereon in either position. The method includes picking up a first die by the tool when the die is oriented in the first position and moving it to a first disposal point, then picking up a second die oriented at an angle relative to the first die and moving the second die to a second disposal point adjacent to the first disposal point, the picking up and moving of the second die being accomplished without rotating the tool in its support.

12 Claims, 6 Drawing Figures

DIE HOLDING TOOL AND METHOD OF USING SAME

This invention relates to improvements in the handling of semiconductor chips or die and, more particularly, to an improved tool suitable for use with a die bonding machine.

BACKGROUND OF THE INVENTION

In a conventional die bonding machine, a heated die-pickup tool is mounted on one end of a swingable arm of the machine for movement in a horizontal plane from a pickup location to a die bonding location. The die picked up by the tool is heated thereby and is moved onto a heated pad on a die support frame at the bonding location and deposited on the pad, following which the arm moves back and forth along its arcuate path through a very small distance as the die engages the pad to cause the die to scrub the pad. The scrubbing action serves to break the surface layer of the pad to assure an effective bond between the die and the pad. Finally, the die is released and, due to the heat of the pad, is bonded to the latter whereupon a number of wires can then be bonded between specific circuit points on the die and certain terminals on the die support frame. The arm then is swung back toward and returns to the pickup location for the next die.

To releasably hold the die thereon, the tool has a fluid passage therethrough which is coupled to a source of vacuum. Thus, the die is picked up and held by the tool by suction and, as it is so held, it is transferred to the bonding location and into scrubbing relationship to the pad. The die is released from the tool by removing the suction force thereon.

In one form of manufacture of light-emitting numeric devices using semiconductor dies or chips, each die is bar-shaped, i.e., it has a length greater than its width. A plurality of such dies are used on a substrate or pad, a first group of such dies forming a pair of parallel, generally upright columns and a second group of dies forming three parallel, generally horizontal rows transverse to the pair of upright columns. Oftentimes, the columns are not truly vertical but lean slightly to one side or the other. Thus, when all the dies are energized, the resulting figure is the numeral 8. Variations in the energization of the dies results in other numeric characters.

Die pick-up tools usable with this type of die have a pair of spaced lips or projections which move into proximity to respective ends of the die as the tool moves close to the die. By applying the aforesaid suction force, the die adheres to the tool with the ends of the die engaging respective lips. These lips are included so that the die makes only edge contact with the tool, thereby avoiding surface contact which would otherwise damage the die. Also, the lips orient the die so that a portion of it projects below the horizontal plane of the lowermost extremity of the tool. Thus, the tool will not engage the pad during the aforesaid scrubbing action.

The tool of a conventional die bonding machine cannot rotate on its mount. The tool is rigid to the outer end of the aforesaid swingable arm. Thus, it is necessary for the machine operator to manually orient each die to assure that it can be picked up properly by the tool. Then, the operator must orient the pad to assure that the die will properly be placed on it as the tool moves the die to the die bonding location. This latter step requires the operator to rotate the support which carried the pad. To rotate the pad support, assuring its proper orientation for both groups of dies becomes quite tedious especially if the dies of the columns are to be inclined relative to the vertical.

The pad support must be rotatable for another reason, namely, that a conventional die bonding machine has only a single scrubbing path. If mutually perpendicular scrubbing paths were utilized, the die would slip off the tool unless the tool itself were rotated relative to the outer end of the arm so that the dieengaging lips could become oriented perpendicular to the direction of the second scrubbing path. Mounting the tool for rotation would require intricate bearing structure because of the relatively small dimensions of the tool. This would add to the cost of and complexity of the die bonding machine.

In light-emitting diodes having the columns of dies inclined relative to the vertical, the columns and rows of dies of a group of diodes which comprise a display, such as the type used in an electronic calculator, must be parallel with each other; otherwise, the appearance of the display suffers and would be such that the entire display would be discarded. This lack of parallelism could well be attributed to improper indexing by the machine operator or by the accumulation of dirt in the bearings of a conventional tool if the latter were to be rotatably mounted on the aforesaid arm.

SUMMARY OF THE INVENTION

The present invention is directed to an improved tool and method of using same wherein the tool, instead of having only a single group of spaced, die-engaging lips, has two groups of such lips, one group being usable to pick up and releasably hold a die when the latter is in a first orientation and the other group being usable to pick up and releasably hold to the first orientation. In this way, the tool can pick up a die in either orientation and transfer it to a pad and deposit it on the pad without having to rotate the support for the pad to change from one orientation to the other. The only requirement is that the operator initially orient each die on its support so that the die will be picked up by the proper group of lips.

The tool permits a first die to be picked up and moved and deposited on the pad, following which a second die oriented at an angle with respect to the first can then be picked up, moved to and deposited on the pad at the aforesaid angle to the first die. Moreover, the scrubbing action can be readily accomplished, the scrubbing movement being in the same, opposed directions regardless of which pair of lips are used to pick up a die and deposit it on the pad. The operator need only move the pad to a location beneath the terminal point of the tool so that, when the tool descends, the die will be directly over the desired location on the pad itself.

The use of the two groups of die-engaging lips on the tool, therefore, simplifies the job of making a light-emitting numeric device. Moreover, this is not the equivalent of rotatably mounting the tool on its mount and using only a single group of lips on the tool. The reason for this is that the tool is heated by its mount so as to pre-heat the die when the latter is picked up by the tool. The heat generated in the tool mount would not permit proper functioning of bearings or other structure for rotatably mounting the tool in the mount.

Thus, the tool is secured in a fixed position to its mount, thereby avoiding the need for sophisticated bearings or other mounting structure.

The tool of the present invention, because of its two groups of die-engaging lips and the fixed angle between said groups, assures that the angle between the columns and rows of dies of a number of diodes of a display will be constant and is repeatable regardless of the number of diodes made with the tool. This thereby assures that an undesirable appearance of the type described above will be avoided.

The primary object of this invention is to provide a die handling tool capable of picking up a die disposed in either of a pair of operative positions so that the die can be held in such operative position as it is transferred to a point of deposit and placed at said point, all of which can be accomplished without having to rotate the tool.

Another object of this invention is to provide a tool of the type described which is provided with first and second groups of die-engaging lips with each group being disposed to permit a die to be picked up from a support surface when the die is oriented in a respective operative position so that the tool is suitable for use with a die bonding machine for transferring a plurality of dies from a source location to a point of use, such as a substrate for making a light-emitting numeric device.

Other objects of this invention will become apparent as the following specification progresses, reference being had to the accompanying drawings for an illustration of the invention.

Figure 1:
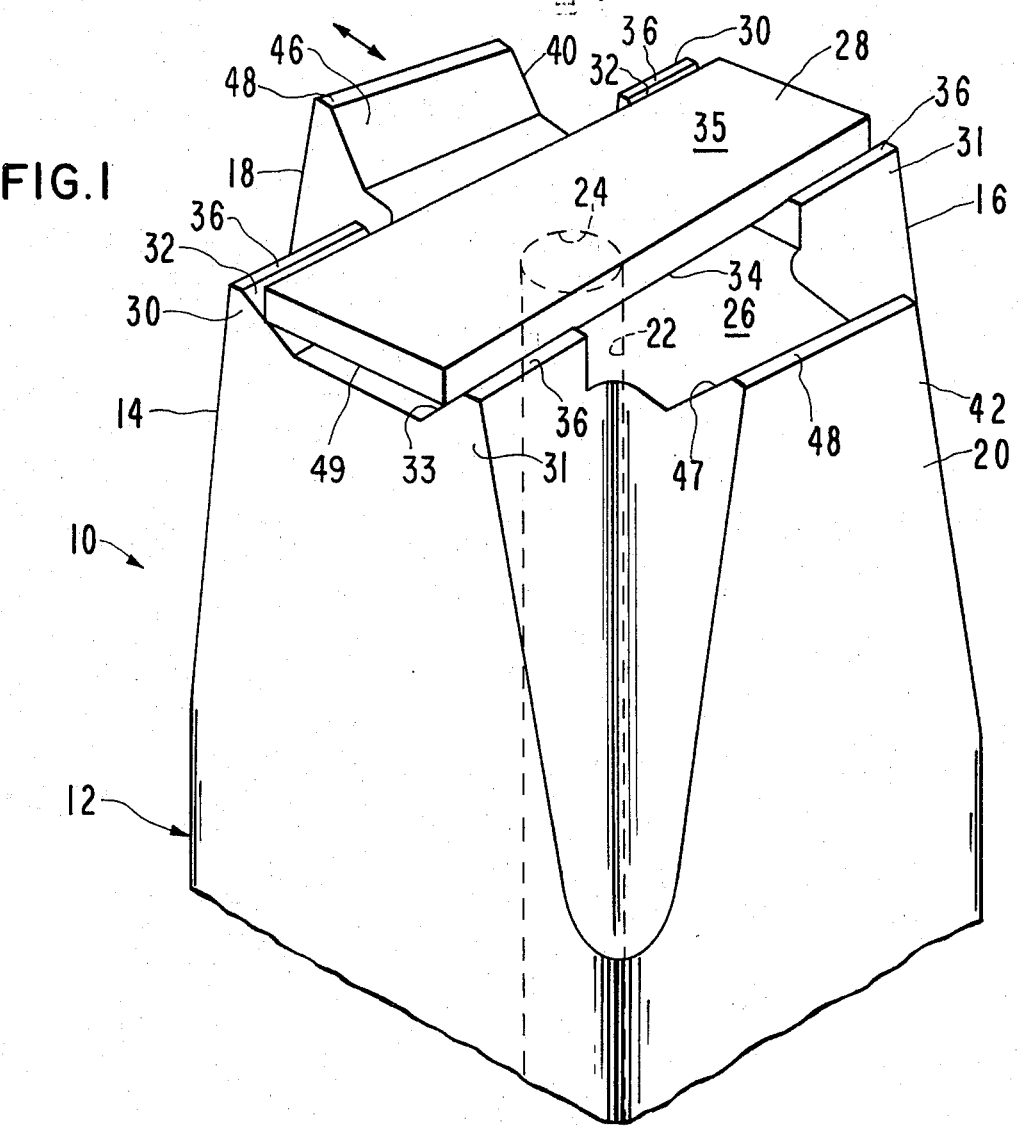
FIG. 1 is a perspective view of the tool in an inverted position, showing a die carried thereby and coupled to a first group of die-engaging lips thereof.

The die handling tool of the present invention is broadly denoted by the numeral 10 and its lower die-engaging end is shown in an inverted condition in FIG. 1. Tool 10 includes a rigid body 12 of a suitable metallic material. Body 12 can be of any configuration but, for purposes of illustration, it has a first pair of opposed sides 14 and 16 and a second pair of opposed sides 18 and 20. Sides 14, 16, 18 and 20 flair outwardly and diverge with respect to each other as the lower end of the tool is approached. The outer surfaces of the sides are substantially flat.

A bore 22 extends through body 12 and has an open lower end 24 terminating at end face 26 (FIGS. 1 and 4) of body 12. Bore 22 is adapted to be coupled to a source of vacuum so that a die 28 (FIG. 1) when in engagement with body 12 in the manner to be described, is held to the lower end of body 12 by suction.

Each of sides 14 and 16 is provided with a pair of generally parallel projections or lips 30 and 31 which extend outwardly from end face 26 and are generally longitudinally aligned with corresponding lips 30 and 31 of the other side. Each lip 30 has an inclined lower surface 32 which faces the corresponding inclined lower surface 33 of the adjacent lip 31. Surfaces 32 and 33 each make an acute angle 37 (FIG. 4) with the plane of lower face 26 defined by line 39. Thus, surfaces 32 and 33 of each pair of lips 30 and 31 converge toward each other as they extend toward lower flat face 26 of body 12. Moreover, surfaces 32 and 33 of the lips 30 and 31 of one side are in alignment with corresponding surfaces 32 and 33 of lips 30 and 31 of the other side.

Figure 4:
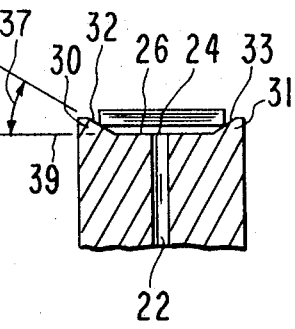
FIG. 4 is a cross-sectional view through the tool showing the way in which a die engages the first group of lips.

Surfaces 32 and 33 of both of lips 30 and 31 are adapted to be engaged by a pair of opposed side edges 34 of die 28 as shown in FIG. 1. Moreover, the distance between each lip 30 and the corresponding lip 31 is such that the die can properly span the distance therebetween yet the outer flat face 35 of the die (FIG. 1) is in a plane parallel to and below the plane passing through the lower flat outer faces 36 of lips 30 and 31 as shown in FIGS. 1 and 4. The reason for this is that it is necessary to scrub the die on the pad onto which the die is to be moved; hence, only the die face 35 and not the tool faces 36 must contact the pad. The scrubbing action serves to break the surface film of the pad to assure a proper bond thereto. Face 35 is the face of the die to be bonded to the pad. The face opposite to face 35 is the one to which contacts are to be connected. If the die is a light-emitting diode, such opposite face is the light-emitter thereof.

Figure 3:
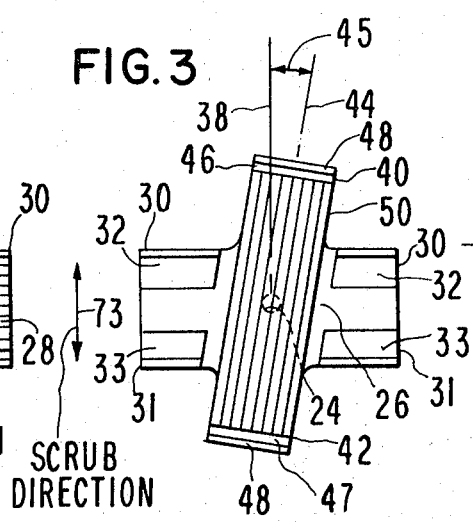
FIG. 3 is a view similar to FIG. 2 but showing the die in a second orientation and in engagement with a second group of die-engaging lips.

As shown in FIG. 3, lips 30 and 31 extend longitudinally between sides 14 and 16 and are substantially perpendicular to an imaginary line 38 drawn through the center of opening 24. Line 38 is the reference by which a second group of die-engaging lips or projections 40 and 42 are oriented.

Figure 2:
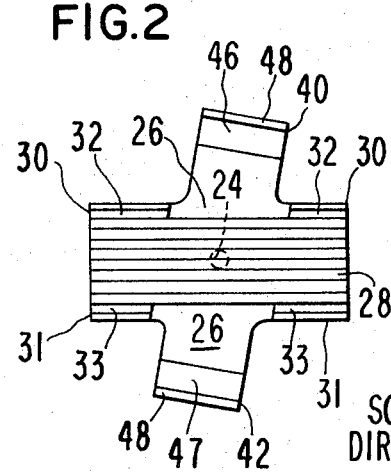
FIG. 2 is a bottom plan view of the tool showing a die in the orientation illustrated in FIG. 1.

Lips 40 and 42 are disposed on the lower outer end of sides 18 and 20 and extend longitudinally of lips 30 and 31 and, for purposes of illustration, are angled with respect thereto as shown in FIGS. 2 and 3. Lips 40 and 42 could be made parallel with lips 30 and 31, rather than angled relative thereto, if desired.

Lips 40 and 42 occupy positions which are spaced outwardly of those of adjacent lips 30 and 31. A center line 44 perpendicular to lips 40 and 42 and passing through the center of opening 24 makes an acute angle 45 with line 38 as shown in FIG. 3. Lips 40 and 42 have respective, inclined surfaces 46 and 47 which converge toward each other as lower end face 26 is approached. Surfaces 46 and 47 are adapted to be engaged by end edges 49 of a die, such as die 28. The distance between surfaces 46 and 47 is substantially equal to the length of the die to be engaged thereby yet the outer flat face of the die will be in a plane below the plane passing through the flat lower faces 48. As shown in FIG. 3, a die 50 extends between and engages surfaces 46 and 47 of lips 40 and 42 so that the die overlies opening 24 yet extends transversely of the position occupied by die 28 of FIG. 2. At any one time, tool 10 can carry only a single die either in the orientation of FIGS. 1 and 2 or the orientation of FIG. 3.

In one application, the tool is adapted for use as part of a die bonding machine 52 (FIG. 6) wherein the tool 10 is mounted on a block 54 carried on an arm 56 secured to a carriage 58 slidably mounted on a shaft 60 for movement from a first position at which tool 10 can pick up a die from a support surface 70 to a second position at which the tool can deposit the die on a pad for bonding thereto. Carriage 58 includes a block 62 pivotally mounted by a pin 64 on an upright member 66 so that arm 56 can rock about the axis of pin 64 to facilitate the pick up and deposit of a die by tool 10. The movement of the tool mount can follow any prescribed path as desired to meet the requirements of the particular bonding machine.

Block 54 is provided with an electrical resistance heater 68 to permit heating of tool 10 so that, when it engages and carries a die to a pad, the die will be pre-heated to facilitate the bond of the same to the pad. The pad will also be pre-heated by being coupled to a heater through the frame on which the pad is located.

Figures 5, 6:
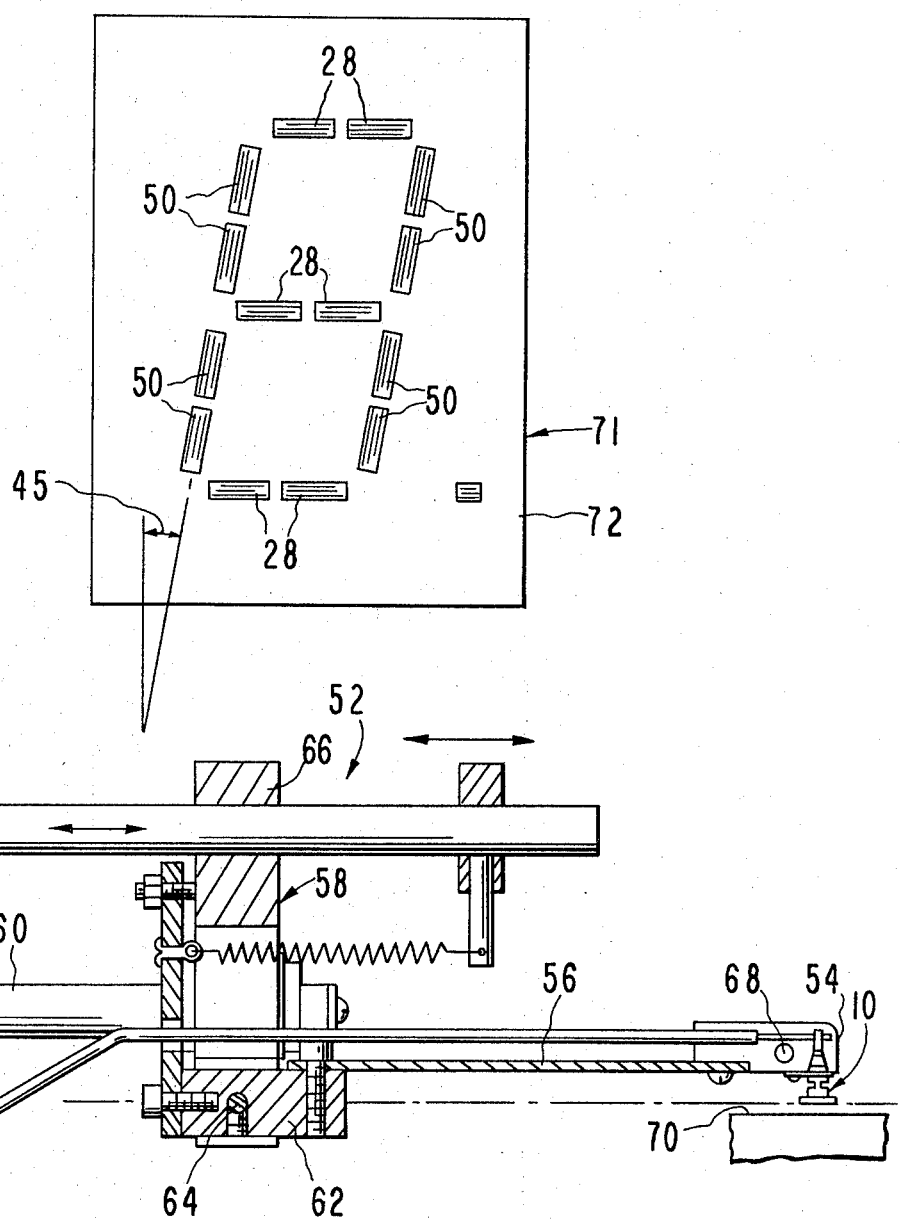
FIG. 5 is a side elevational view of a light-emitting numeric device which can be used to be constructed with the use of the tool of the present invention.
FIG. 6 is a vertical section through a portion of a die bonding machine, showing the tool thereon.

In use, assuming tool 10 is mounted on machine 52, as shown in FIG. 6, the tool is pre-heated and a plurality of dies 28 and 50 will be disposed on support surface 70 in any orientation. Typically, it will be desirable in making a numeric device 71 to place three groups of two dies 28 in three horizontal rows on a pad 72 as shown in FIG. 5 and two groups of four dies 50 in upright rows interconnecting the three horizontal rows of dies 28. The orientation of dies 50 will be at angle 45 with respect to the vertical so that the resulting assembly of dies on pad 72 will form numeric device 71 suitable for a wide variety of uses. The numeric device will be energized by applying voltages to individual dies as is well-known.

To form the three horizontal rows of dies 28, tool 10 is moved downwardly onto each die 28 after the die has been oriented by manually moving the same with tweezers or the like into general alignment with surfaces 32 and 33 of both pairs of lips 30 and 31 of tool 10. Then, suction is applied to lower end 24 of passage 22, whereupon the die is drawn upwardly and into engagement with lips 30 and 31 in the manner shown in FIGS. 1 and 2; then, arm 56 is shifted to transfer the tool and the die carried thereby to pad 72. The tool is then lowered onto the pad and moved back and forth as denoted by arrow 73 (FIG. 2) to cause outer face 35 of the die 28 to scrub the surface of the pad to break the surface oxide layer thereof. Then, the heat of the die and the pad effects a bond therebetween whereupon the tool is returned to surface 70 for the next die. Typically, all of the three horizontal rows of dies 28 are first put in place, following which the two parallel rows of 50 are then put into place. This sequence can be changed as desired.

To form each row of dies 50, the tool is moved toward surface 70 after a die 50 has been generally oriented in the manner shown in FIG. 3. Then, surfaces 46 and 47 of lips 40 and 42 move into engagement with the end edges 4a of the die, whereupon suction is applied at lower end 24 of passage 22, causing the die to be releasably held in engagement with surfaces 46 and 48. Then the tool is shifted to a location at which it can be lowered onto pad 72, following which the tool is vibrated back and forth in the direction of arrow 73 to scrub the pad to remove the surface oxide layer thereof. Then, heat of the die and the pad effects a bond therebetween. This procedure is continued until all dies 50 are in place.

The only operator attention in carrying out the bonding operation using tool 10 is to manually orient the dies on surface 70 so that they are essentially in alignment with the surfaces of the lips of the tool. A mirror arrangement can be used to permit viewing the underside of the tool as it is lowered onto a particular die. An operator can become quite adept at quickly and easily orienting a die so that it will be properly engaged by the desired lips of the tool so that, when deposited on the pad, it will be in the proper orientation with respect to adjacent dies.

It is clear that the vertical rows of dies 50 need not be at angle 45 to the horizontal rows of dies 28. Such rows can be perpendicular to each other or at a different angle from that illustrated. The primary advantage of tool 10 is that it can quickly and easily transfer dies to a pad for bonding without having to be rotated on block 54. Thus, intricate bearing means is not required and the tool can be easily handled and used with any desired bonding machine.

I claim:

1. A tool for engaging and holding an elongated die in either of a pair of relatively angularly disposed operative positions with the die having a first pair of opposed margins and a second pair of opposed margins comprising: a body having a pair of opposed ends; first surface means on one end of the body for engaging said first pair of opposed margins of an elongated die when the die is in one of said operative positions; second surface means on said one end of the body for engaging said second pair of opposed margins of said die when the die is in the other of said operative positions, said second surface means extending longitudinally of said first surface means; and means on the body for permitting a suction force to be generated at said end thereof so that the die can be held thereto by said force when the die is in either of said positions.

2. A tool as set forth in claim 1, wherein said first surface means includes a first group of spaced lips, said second surface means including a second group of spaced lips.

3. A tool as set forth in claim 2, wherein each lip has an inclined, die-engaging surface.

4. A tool as set forth in claim 2, wherein each die has a pair of opposed side edges and a pair of opposed end edges, the first group of lips adapted to engage only the side edges of a die, the second group of lips adapted to engage only the end edges of a die.

5. A tool as set forth in claim 2, wherein the orientation of the first group of lips is at an acute angle with respect to the orientation of the second group of lips.

6. A tool as set forth in claim 2, wherein the lips of each group are provided with inclined, lowermost surfaces, said lowermost surfaces converging toward and being spaced from corresponding surfaces of the other lips.

7. A tool as set forth in claim 1, wherein said permitting means includes a central portion of the body having a bore therethrough terminating at said end thereof, the bore adapted to be coupled to a source of vacuum.

8. A tool for engaging and holding an elongated die in either of a pair of relatively angularly disposed operative positions comprising: a body having a pair of opposed ends; a first group of spaced lips projecting outwardly from one end of said body; a second group of spaced lips projecting outwardly from said one end of the body, the first group of lips being disposed to permit a die to extend therebetween when the die is in a first of said positions, the second group of lips being disposed to permit a die to extend therebetween when the die is in the second of said positions, the first group of lips extending longitudinally of the second group of lips; and means on the body for permitting a suction force to be generated at said one end thereof so that the die can be held thereto by said force when the die is in either of said positions.

9. A tool for a die bonding machine comprising: an elongated body having a pair of opposed ends and adapted to be secured to one end of a die bonding machine and to depend therefrom; a first group of lips mounted on the lower end of the body and adapted to engage a first pair of opposed extremities of a die when the latter is in a first orientation of a supporting surface; a second group of lips on the lower end of the body for engaging a second pair of opposed extremities of a die when the latter is in a second orientation on said supporting surface, said body having a fluid passage therethrough, the second groups of lips being disposed on opposite sides of the passage centrally of said lower end of the body, said first groups of lips including a first pair of lips on one side of the second group and a second pair of lips on the opposite side of said second group, the first and second pairs having inclined lowermost surfaces for engaging the opposed side margins of an elongated die, said passage terminating at said lower end thereof and adapted to be coupled with a source of vacuum, whereby a die in engagement with either group of lips can become releasably attached to the body by a suction force to permit the body to carry the die to a point of release remote from the support.

10. A tool as set forth in claim 9, wherein said inclined surfaces are spaced sufficiently close together to permit the lower face of the die engaged thereby to be in a plane below the plane passing through the lowermost extremity of the body.

11. A tool for a die bonding machine comprising: an elongated body having a pair of opposed ends and a lower, flat face, said body adapted to be coupled to a die bonding machine; first and second groups of lips on the lower end of the body and projecting downwardly and outwardly from said face, each group of lips having at least a pair of inclined, die-engaging surfaces, the surfaces being relatively convergent as the lower, flat face is approached, said first group of lips being adapted to engage a first pair of opposed extremities of a die when the latter is in a first orientation relative to a supporting surface, said second group of lips being adapted to engage a second pair of opposed extremities of a die when the latter is in a second orientation relative to said supporting surface, said body having a fluid passage therethrough, said passage terminating at said lower, flat face of the body and adapted to be coupled with a source of vacuum, whereby a die in engagement with either group of lips can become releasably attached to the body by a suction force to permit the body to carry the die to a point of release remote from the support.

12. A tool for a die bonding machine comprising: an elongated body having a first pair of opposed sides, a second pair of opposed sides, and a pair of opposed ends, said body adapted to be coupled to a die bonding machine; a first group of lips mounted on the lower end of the body, extending transversely to the first sides, and adapted to engage a first pair of opposed extremities of a die when the latter is in a first orientation relative to a supporting surface; a second group of lips on the lower end of the body and extending substantially parallel to the second sides for engaging a second pair of opposed extremities of a die when the latter is in a second orientation on said supporting surface, the second group of lips extending longitudinally of the first group of lips and being spaced outwardly therefrom, said body having a fluid passage therethrough, said passage terminating at said lower end thereof and adapted to be coupled with a source of vacuum, whereby a die in engagement with either group of lips can become releasably attached to the body by a suction force to permit the body to carry the die to a point of release remote from the support.

* * * * *